(12) United States Patent
Seekell

(10) Patent No.: US 11,942,238 B2
(45) Date of Patent: Mar. 26, 2024

(54) INSULATOR FOR STRINGING BLOCK

(71) Applicant: Robert Seekell, Kuna, ID (US)

(72) Inventor: Robert Seekell, Kuna, ID (US)

( * ) Notice: Subject to any disclaimer, the term of this patent is extended or adjusted under 35 U.S.C. 154(b) by 305 days.

(21) Appl. No.: 17/402,975

(22) Filed: Aug. 16, 2021

(65) Prior Publication Data

US 2023/0047691 A1 Feb. 16, 2023

(51) Int. Cl.
*H01B 17/08* (2006.01)
*H01B 17/56* (2006.01)
*H01R 4/64* (2006.01)
*H02G 1/04* (2006.01)
*H02G 7/20* (2006.01)

(52) U.S. Cl.
CPC ............. *H01B 17/08* (2013.01); *H01B 17/56* (2013.01); *H01R 4/64* (2013.01); *H02G 1/04* (2013.01); *H02G 7/205* (2013.01)

(58) Field of Classification Search
CPC .......... H01B 17/08; H01B 17/56; H02G 1/04; H02G 7/205; H01R 4/64
See application file for complete search history.

(56) References Cited

U.S. PATENT DOCUMENTS

| | | | | |
|---|---|---|---|---|
| 1,768,948 A * | 7/1930 | Baum | ................. | H01B 17/42 174/209 |
| 2,786,885 A * | 3/1957 | Wilson | ................. | H02G 7/053 24/135 N |
| 3,012,756 A * | 12/1961 | Cronkright | ............. | H02G 1/04 174/40 R |
| 3,250,171 A * | 5/1966 | Taylor | .................. | H01B 17/08 403/388 |
| 3,545,724 A * | 12/1970 | Wright | ................. | H02G 1/04 254/134.3 PA |
| 3,596,947 A * | 8/1971 | Ishihara | .................. | H02G 7/05 174/150 |
| 2008/0164061 A1* | 7/2008 | Holloman | ............. | H02G 7/053 174/40 R |
| 2013/0306355 A1* | 11/2013 | Clement | ................. | H01B 17/16 174/168 |
| 2020/0220338 A1* | 7/2020 | Seekell | .................. | H02G 1/02 |

OTHER PUBLICATIONS

English Translation WO97/34350, Edmund Stenslie, Published Sep. 18, 1997 (Year: 1997).*

* cited by examiner

*Primary Examiner* — Steven T Sawyer
(74) *Attorney, Agent, or Firm* — Shaver & Swanson; Scott D. Swanson

(57) ABSTRACT

What is disclosed is an insulator for providing insulation between a stringing block for an electrical conductor and a pole or cross arm on which the stringing block is mounted. The insulator is made of a non-conductive material such as plastic. The insulator has an upper opening in the body that is configured for receiving a flange of a stringing roller. The insulator can be configured to be mounted directly to a pole or cross arm, such as by using a ratcheting strap. Alternatively the insulator can be configured to be positioned between the roller and a base, such as those known in the prior art.

11 Claims, 8 Drawing Sheets

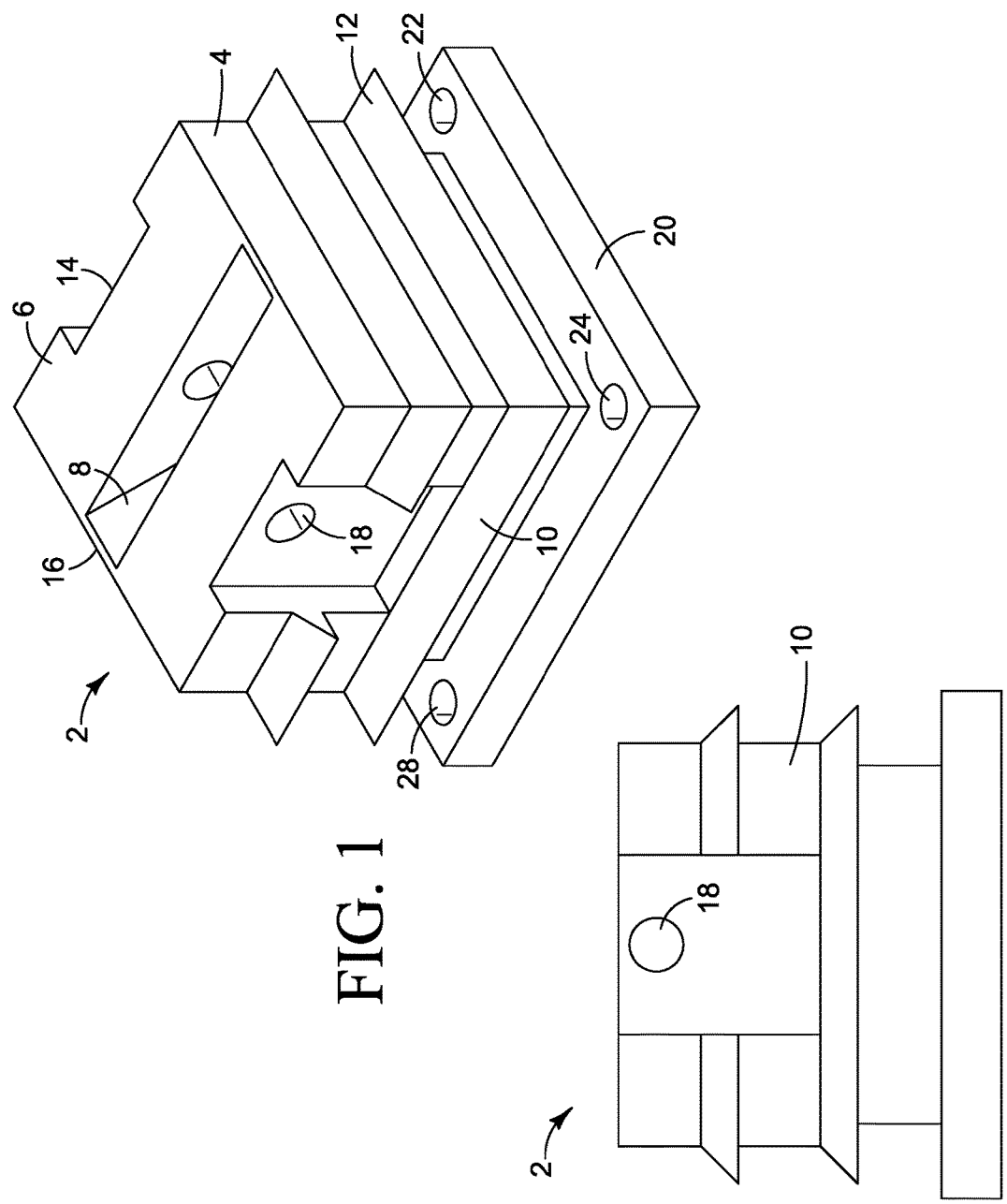

INSULATOR FOR STRINGING BLOCK

TECHNICAL FIELD

The presently disclosed technology relates to the distribution of electricity. More particularly, the present invention is an insulator for use with stringing blocks, for example in electricity distribution circuits.

BACKGROUND

Electric power distribution is the final stage of the power delivery system before voltage gets stepped down to useable secondary voltage (120/240) (277/480) 480 volts to customer's meters.

Electricity is created at generation facilities across the world. In the US, voltage is generated at 13.8 kv to 24 kv and immediately stepped up to high higher transmission voltages, up to 500 kv and higher. The use of transformers helps make this happen where the voltages are stepped up and down.

The generation stations in the US are tied together through transmission systems referred to as "the Grid". Transmission systems move large quantities of power over long distances at higher voltages to transmission substations where the voltage is stepped down to lower voltages.

The lower voltage is referred to as sub transmission voltage ranging from 44 kv to 138 kv. The sub transmission structures are smaller and easier to install in populated areas. Some sub transmission is used to deliver power to large industrial customers.

Distribution substations are fed by sub transmission circuits where with the use of transformers, the voltage is stepped down to 12 kv up to 34.5 kv where it then leaves the substation and goes to residential neighborhoods.

When a new conductor is introduced into the electrical distribution system, whether it be transmission, sub transmission or distribution, there is a need to run the wires from structure to structure. The structures can be either wood poles, metal poles, lattice towers or fiberglass poles. Most often on main lines, the structure will have four (4) conductors on each pole and sometimes double circuits that could be eight (8) or more conductors. The wires or conductor might run one to two (1-2) miles in town or about forty (40) poles per mile. In town distribution poles have an average spacing of about 132 feet. Line workers install rollers on top of a crossarm or utility arm or hang under an insulator to pull in rope that pulls in the new conductor. The term roller as used herein is used to define blocks with single rollers (such as those that have the appearance of a pulley as well as the inventor's CRS Blocks which have a series of rollers as opposed to a single pulley). When there are existing energized conductors on the crossarm or utility arm, line workers have to move the conductors while they are energized to fiberglass temp arms that attach to existing crossarm or utility arms. The reason for this step is to make room to install the rollers to the crossarm or utility arm to pull in the new conductor. The rollers will be placed next to distribution conductor insulators that are mounted to the utility cross arm.

The blocks and attachment mechanisms that currently exist to attach the blocks to the crossarm or utility pole do not allow for energization of the block without creating a dangerous situation in which the crossarm or utility pole is also energized. Thus typically conductor is not energized when it is positioned in these stringing blocks. However, it could safer, save time and save money if a conductor could be energized while in a stringing block. Further, the blocks today have to be bolted to the existing insulator that is the final resting location for the new conductor. The line workers can energize the conductor when in the rollers on the insulator but need to shut off power to remove the roller off insulator and move the conductor again to top of insulator to get tied in its final location. The procedure of doing this task today the line workers have to handle the weight of the new conductor 4 times. With the new design of a stringing block insulator the conductor only must be handled one time, from roller to final resting location on top of conductor insulator.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is an insulator for use with stringing blocks. Typically these blocks utilize a flange that is positioned on the block. The flange is typically in a v-shape. The v-shaped flange has a pin hole through the flange. The flange is configured to be positioned in a bracket that has a v-shaped opening to receive the flange. The bracket has a through hole that allows for a retaining pin to be positioned through the hole and through the flange to retain the flange and block in the bracket. The preferred insulator disclosed herein is an insulator for use with a stringing block of an electrical power distribution system described above. The insulator having a body. The body being of a nonconductive material at least in part. The body comprising a top side and a bottom side. The top side defines a top opening configured to receive the flange of a stringing block, simulating the opening on a mounting bracket. The body is configured to attach to a power distribution pole or crossarm, either directly or indirectly. The body comprising a through hole aligned with said top opening such that a pin is positionable through said through hole and the flange of a stringing block positioned in the top opening to secure the stringing block to said body.

The body is configured to be positioned between the stringing block and the distribution pole or crossarm when the stringing block is attached to the body of the insulator with the flange of the stringing block secured in the top opening.

The insulator can be configured to attach to said distribution pole or crossarm by a ratcheting strap attaching to the insulator. In this embodiment the insulator preferably has two opposing rails positioned on opposing sides of said body configured for attachment to hooks at opposite ends of a ratcheting strap. The body can be integral with the rails, or the rails can be attached to a base that connects to the body. The base can be made of a conductive material. The body and base can be connected by a series of connectors, such as nut and bolt connectors.

Alternatively the insulator can be positionable between the block and a mounting bracket. In this embodiment the body has a flange that simulates a flange of a block. The flange can be integral with the body of formed or connected to a base that is attached via connectors, as discussed above. The two bases can be interchangeable.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

BRIEF DESCRIPTION OF THE DRAWINGS

FIG. 1 is a perspective view of a body of an insulator.

FIG. 2 is a side eye symmetric view of the body of the insulator of FIG. 1.

DETAILED DESCRIPTION OF THE PREFERRED EMBODIMENTS

Figure 3:
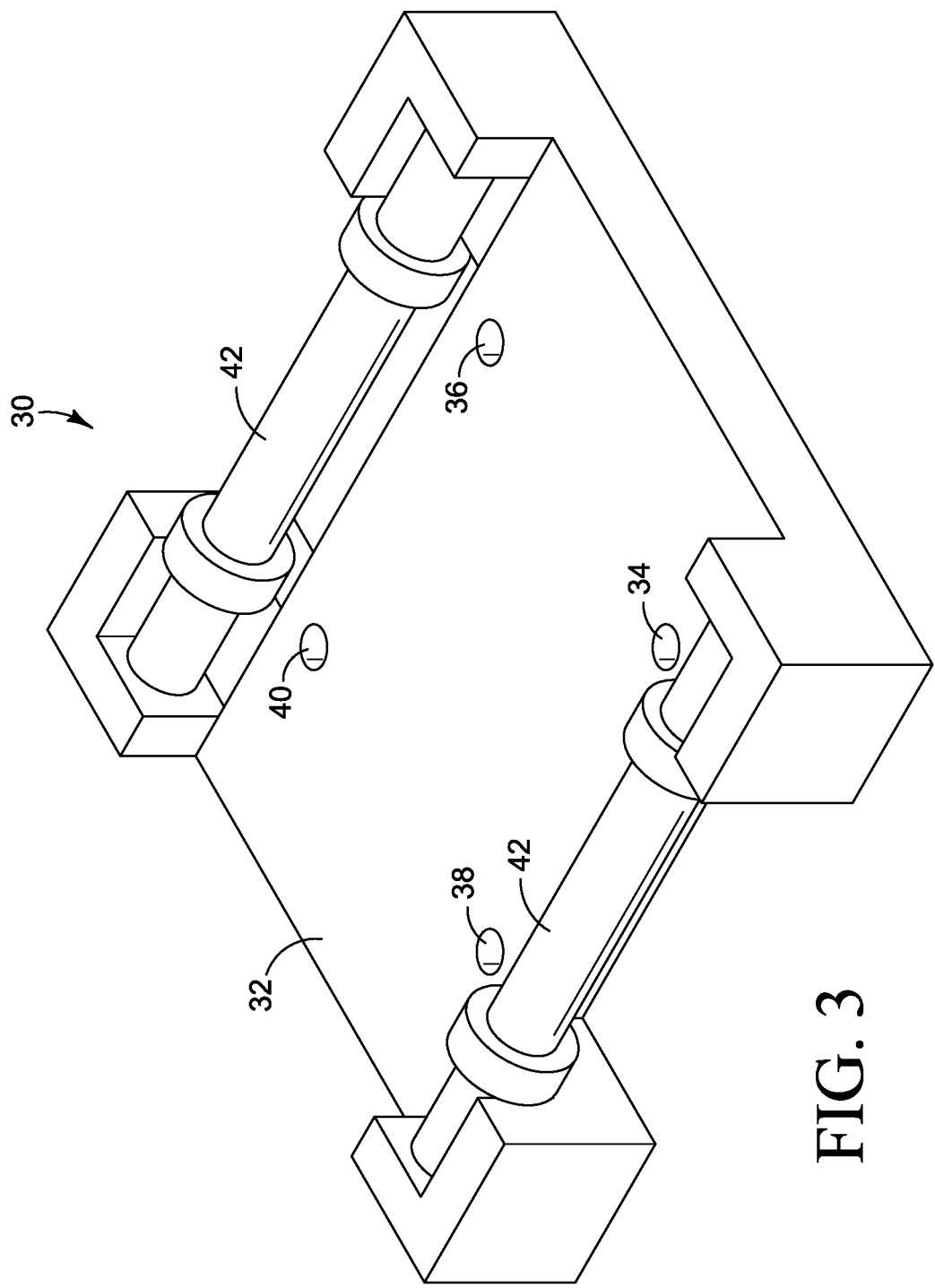
FIG. 3 is a perspective view of a base for connection to the insulator of FIG. 1.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a body of an insulator for use with a stringing block or roller. The body is formed of a non-conductive material such as a plastic, such as Delrin® plastic (generically called acetal plastic), or alternative non-conductive material. The body in the depicted embodiment is formed in a generally square shape. The body 2 has a top side 6. A triangular opening 8 extends into the upper surface. The triangular opening is configured for the triangular flange of a stringing roller to be inserted into the triangular opening. The body has 4 sides 12, 14, 16, 10. Two opposing sides 10, 14 are configured with openings 18 (second opening not shown) that provide a passageway through the body such that a pin can be positioned through opening 18, into the opening 8, and through an opening in a flange of a stringing roller. The pin retains the stringing roller to the body. The body is formed with a mounting flange 20. The mounting flange is configured for attachment to a base. Four openings are provided in the base for connectors, such as bolts, to be placed through the openings and into an opening in a corresponding base. Alternatively, the body and base can be formed integrally as a uniform non-conductive material. In the depicted embodiment, the body is formed of a non-conductive material with the base preferably formed by a metal such as aluminum.

FIG. 3 illustrates an embodiment of a base 30. The base has a flat top surface 32 configure for engagement with a bottom surface of the body of FIGS. 1 and 2. The base has four openings 34, 36, 38, 40 that correspond to the four openings of FIG. 1. The openings are configured for placement of a connector through the openings of the body and the base. In the depicted embodiment, the base has opposing bars 42, 43 that are configured for attachment of a hook of a ratcheting strap. The hook and ratcheting strap allow for the assembled base and body to be connected to a pole or arm onto which a stringing block is mounted for placement of a conductor of energy.

Figure 4:
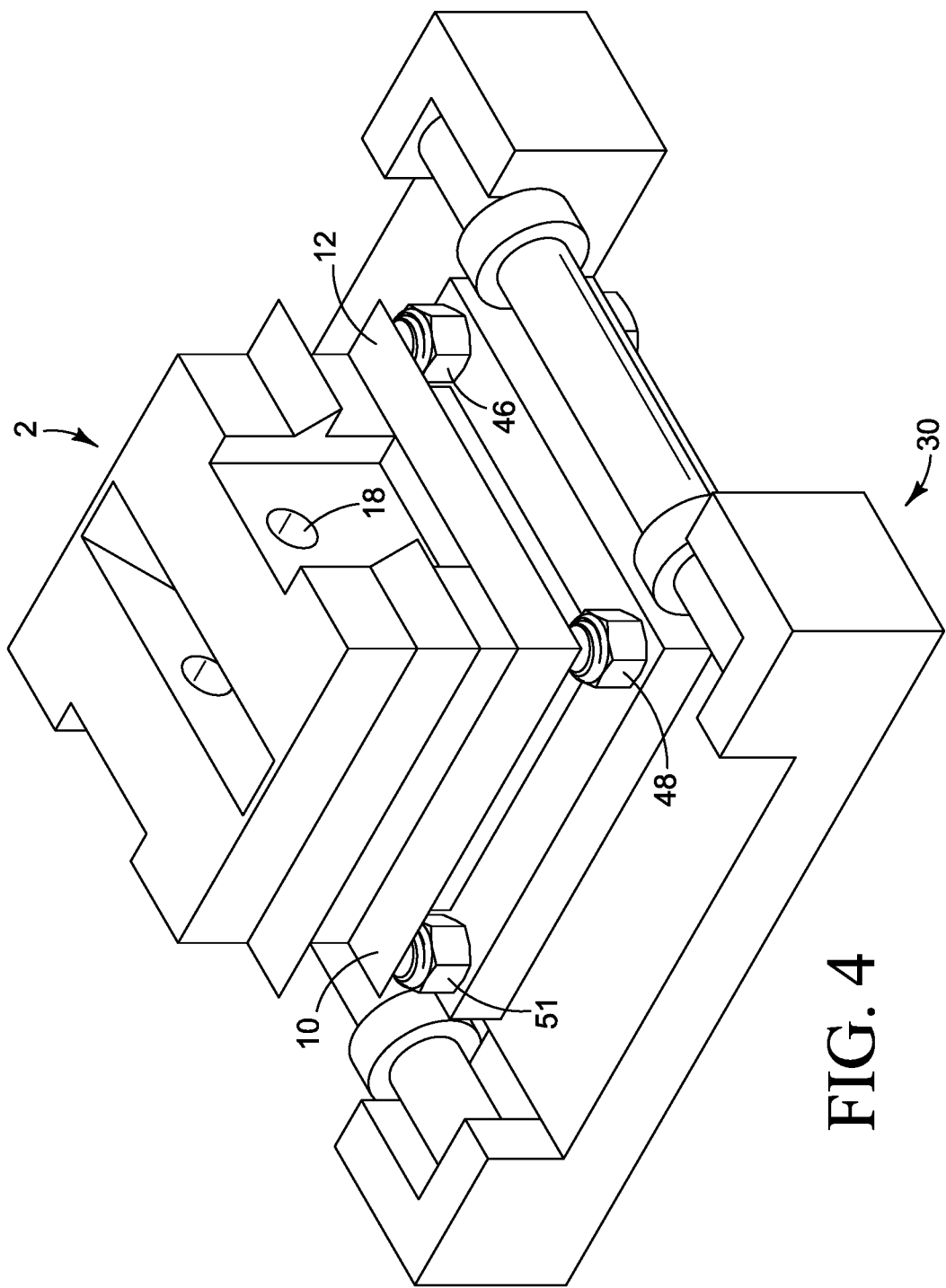
FIG. 4 is an assembled base and body of an insulator.

FIG. 4 illustrates an assembled base 30 and body 2. The base and body are connected by four connectors 46, 48, 50 (fourth not shown). The connectors comprise a nut and bolt.

Figure 5:
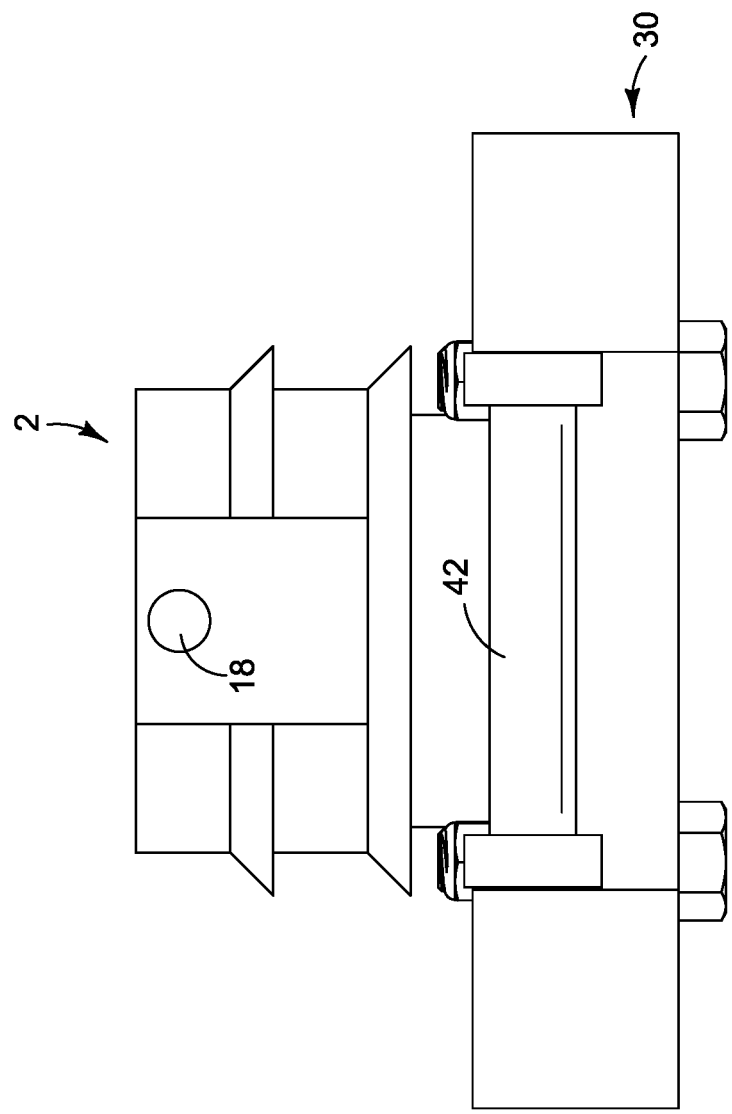
FIG. 5 is a side view of the assembled insulator of FIG. 4.
Figure 9:
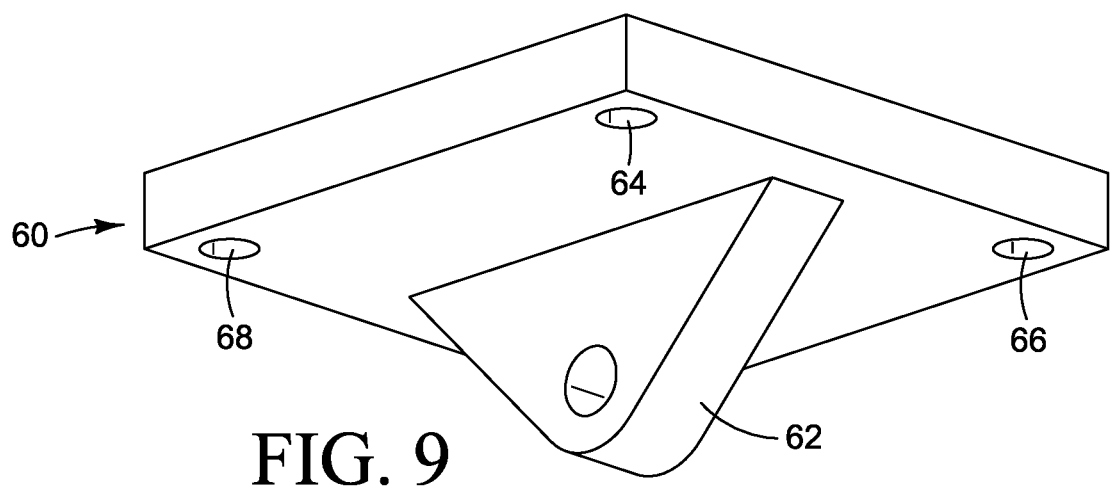
FIG. 9 is a perspective view of the insulator having the attached base of FIG. 8.

FIG. 5 illustrates a side eye symmetric view of the assembled connector shown in FIG. 9.

Figure 6:
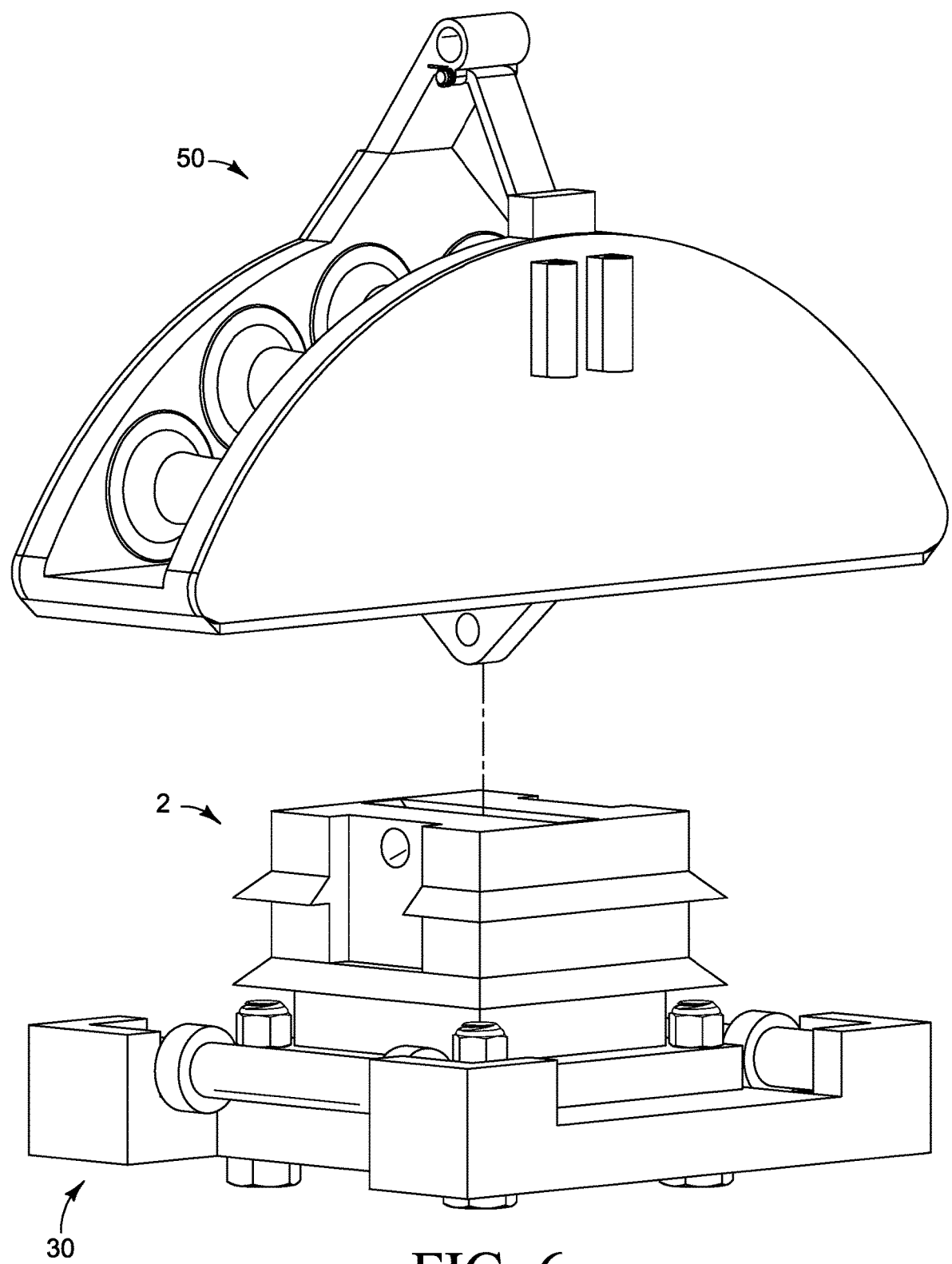
FIG. 6 is a partially exploded view of the insulator of FIG. 6 with a CRS roller.

FIG. 6 illustrates an embodiment of a conductor roller 51 in an exploded view relative to the insulator.

Figure 7:
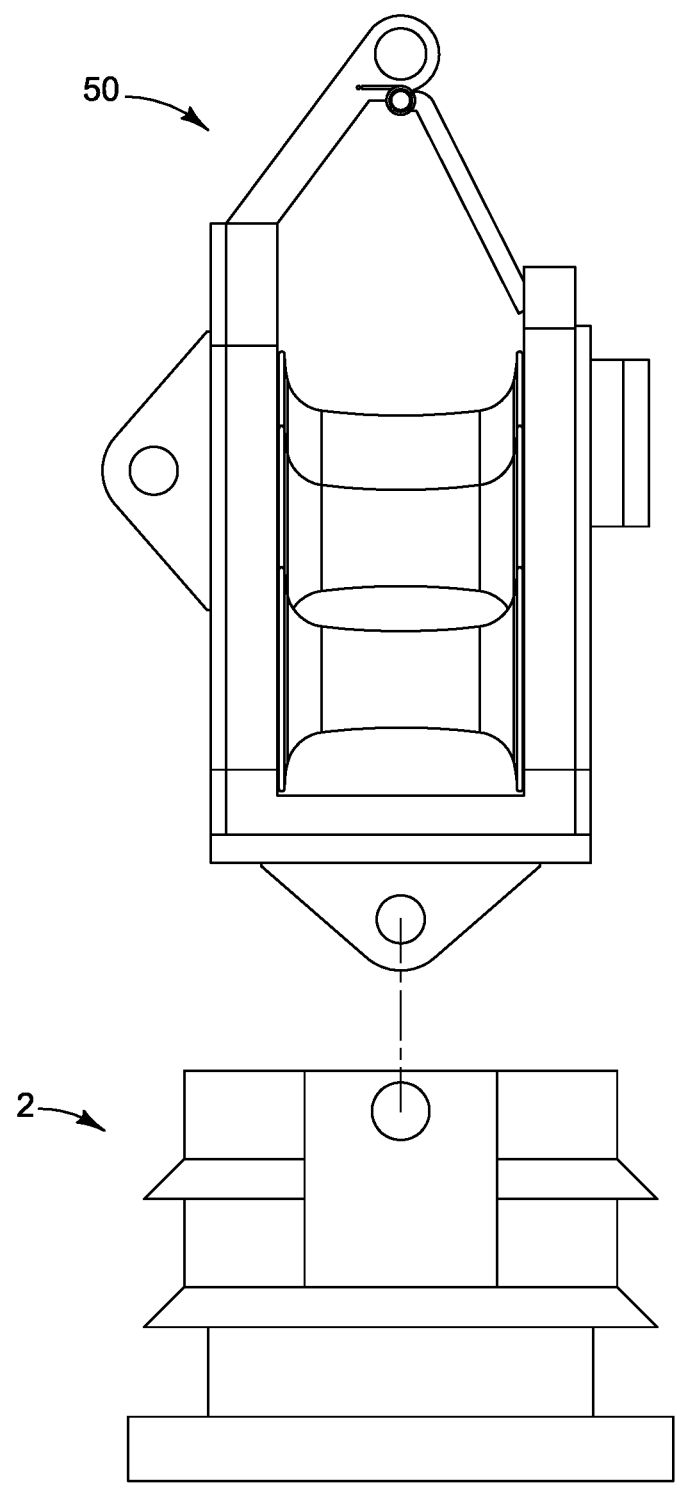
FIG. 7 is a side eye symmetric view of the insulator plus roller of FIG. 6.

FIG. 7 illustrates a side perspective view of the roller 51 illustrating the openings 18, 51 that align for positioning of a pin therethrough.

FIG. 9 illustrates a perspective view of a second preferred embodiment of a base. In the depicted embodiment, the base has a v-shaped flange 62 extending from the bottom side of the base. The flange is configured to mimic or replace a flange on a roller, such as U.S. Pat. No. 6,375,163 or 10,998,700. The base is configured with four openings 64, 66, 68 (fourth not shown). The base 60 is configured for connection to the body 2 of FIG. 1.

Figure 8:
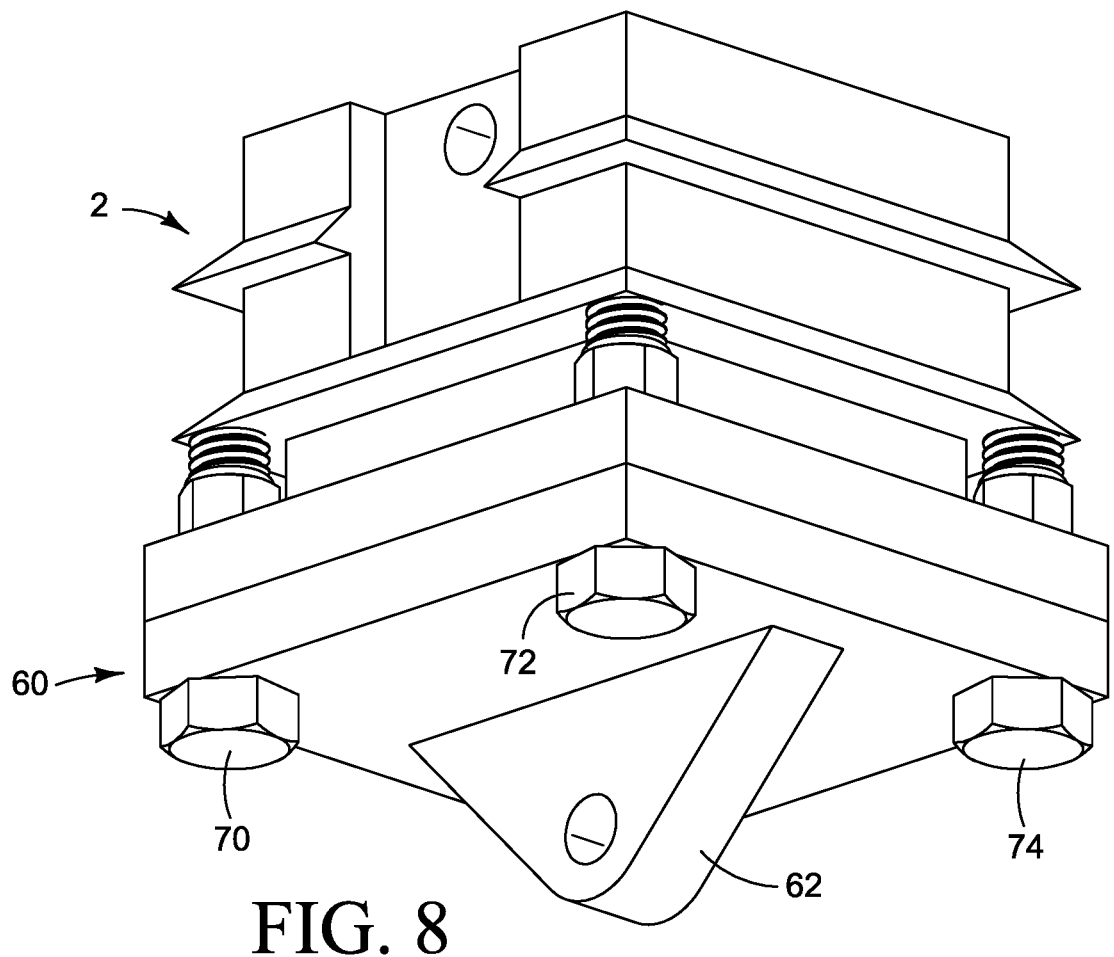
FIG. 8 is an alternative embodiment of a base of an insulator.

FIG. 9 illustrates an assembled insulator utilizing the body 2 and base 60 of FIG. 8. Four connectors 70, 72, 74 (fourth not shown) connect the base to the body. The assembled configuration allows for a v-shaped flange of a roller to be positioned in the v-shaped opening of the body. The v-shaped flange of the base is then positionable into a mounting block, such as that seen in U.S. Pat. No. 10,998, 700 at FIG. 1.

Figure 10:
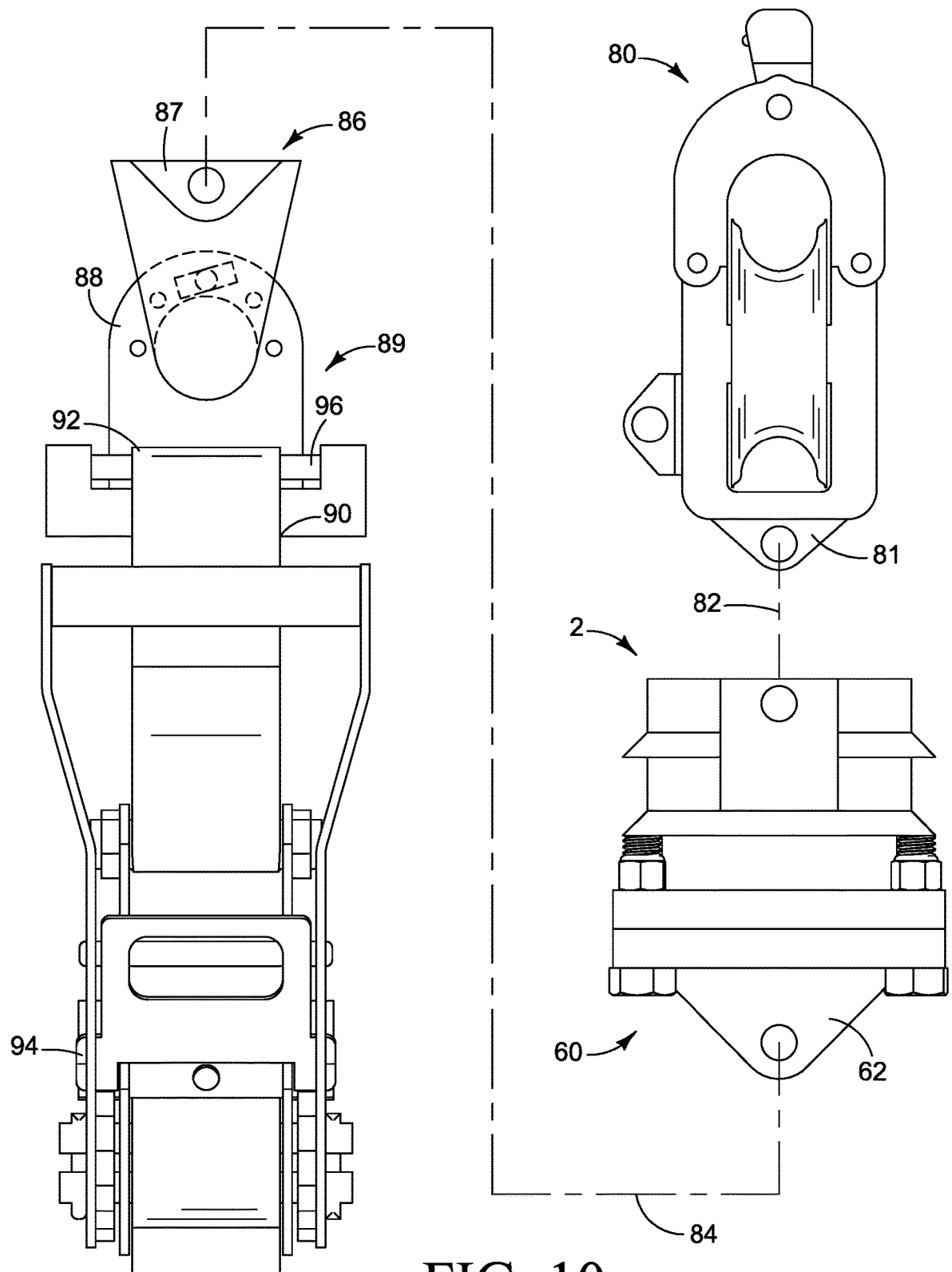
FIG. 10 is a partially exploded view of a prior art roller, an insulator, and a CRS block and ratchet strap.

FIG. 10 illustrates an assembled body 2 and base 60 of FIG. 8 positioned relative to a prior art roller 80. The prior art stringing block flange 81 is positioned within the V-shaped opening of the body 2 as a shown by line 82. The base 60 has a v-shaped flange that corresponds to the stringing block flange 81 of the prior art stringing block (not shown to scale). The insulator flange 62 is configured for insertion into the v-shaped opening 87 of the inventor's CRS block. The CRS block has an upper portion 86 that rotates on a projection 88 of a base 89 to allow for altering position of the roller relative to the pole or cross arm on which it is installed. This upper portion 86 is an example of a bracket into which the flange 81 of the example stringing block is inserted into. FIG. 10 further illustrates a ratchet strap having a ratchet mechanism 94, strap 90, and hook 92 that attaches to the pole 96 of the base. This same type of ratchet strap is utilized to attach the base of FIGS. 2-5 to a pole or cross arm.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. An insulator for use with a stringing block of an electrical power distribution system, said stringing block having a stringing block flange defining a pin hole, the stringing block flange being configured for insertion into a female opening of a bracket for mounting the stringing block to a power distribution pole or crossarm, said insulator comprising:

a body, said body comprising a nonconductive material, said body comprising a top side, wherein said top side defines a top opening configured to receive the stringing block flange, wherein said body is configured to attach to the power distribution pole or crossarm, wherein said body comprises a through hole aligned with said top opening such that a pin is positionable through said through hole and the stringing block flange positioned in said top opening to secure the stringing block to said body;

wherein said body is configured to be positioned between the stringing block and the distribution pole or crossarm when said stringing block is attached to said body of said insulator with the stringing block flange secured in said top opening, wherein said insulator comprises two opposing rails positioned on opposing sides of said body configured for attachment to hooks at opposite ends of a ratcheting strap to attach said insulator to said distribution pole or crossarm.

2. The insulator of claim 1, wherein said opposing rails are connected to a base, wherein said base is connected to said body.

3. The insulator of claim 1, wherein said top opening is v-shaped.

4. The insulator of claim 2, wherein said base comprises a conductive material.

5. The insulator of claim 2, wherein said base is connected to said body by a series of connectors.

6. The insulator of claim 4, wherein said conductive material is aluminum.

7. The insulator of claim 5, wherein said connectors comprise nut and bolt connectors.

8. An insulator for use with a stringing block of an electrical power distribution system, said stringing block having a stringing block flange defining a pin hole, the stringing block flange being configured for insertion into a female opening of a bracket configured for mounting the stringing block to a power distribution pole or crossarm, said insulator comprising:

a body, said body comprising a nonconductive material, said body comprising a top side, wherein said top side defines a top opening configured to receive the stringing block flange, wherein said body is configured to attach to the power distribution pole or crossarm, wherein said body comprises a through hole aligned with said top opening such that a pin is positionable through said through hole and the stringing block flange positioned in said top opening to secure the stringing block to said body; an insulator flange extending from said body and configured to insert into the female opening of said bracket; wherein said body is configured to be positioned between the stringing block and the distribution pole or crossarm when said stringing block is attached to said body of said insulator with the stringing block flange secured in said top opening.

9. The insulator of claim 8, wherein said insulator flange extends from a base, wherein said base is attached to said body.

10. The insulator of claim 9, wherein said base is connected to said body by a series of connectors.

11. The insulator of claim 10, wherein said connectors comprise nut and bolt connectors.

\* \* \* \* \*